United States Patent [19]

Oishi et al.

[11] Patent Number: 4,842,379
[45] Date of Patent: Jun. 27, 1989

[54] IMAGE RECORDING APPARATUS UTILIZING AN ECB MODE LIQUID CRYSTAL

[75] Inventors: Hisao Oishi; Kazuhiko Yanagihara; Tadashi Miyakawa, all of Kanagawa; Takeshi Nakamura, Osaka; Kazuhiko Akimoto, Osaka; Mitsuaki Shioji, Osaka, all of Japan

[73] Assignees: Fuji Photo Film Co., Ltd., Kanagawa; Sharp Kabushiki Kaisha, Osaka, both of Japan

[21] Appl. No.: 120,451

[22] Filed: Nov. 13, 1987

[30] Foreign Application Priority Data

Nov. 13, 1986 [JP] Japan ................... 61-270533

[51] Int. Cl.⁴ ............................. G02F 1/13
[52] U.S. Cl. .................. 350/347 E; 350/335
[58] Field of Search ............... 350/347 V, 347 E, 335

[56] References Cited

U.S. PATENT DOCUMENTS 4,097,128  6/1978  Matsumoto et al. ........... 350/347 G
4,610,507  9/1986  Kamamori et al. ................. 350/335
4,790,632  12/1988  Miyakawa et al. ............. 350/347 V Primary Examiner—Stanley D. Miller
Assistant Examiner—Huy Kim Mai
Attorney, Agent, or Firm—Sughrue, Mion, Zinn, Macpeak & Seas

[57] ABSTRACT

A color image recording apparatus employing a liquid crystal shutter array in which a color picture can be recorded with high quality using a small-sized apparatus and without requiring complex operations. A liquid crystal shutter array of the apparatus includes pixel electrodes and a shutter common electrode disposed in opposition to the pixel electrodes with a gap therebetween filled with a liquid crystal, a pair of transparent substrates supporting the pixel electrodes and the shutter common electrode by sandwiching the pixel electrodes and the shutter common electrode therebetween, and polarization plates stacked on the respective outsides of the transparent plates. A color liquid crystal layer is stacked on the liquid crystal shutter array constituted by first and second common electrodes disposed in opposition to each other with the gap therebetween filled with an ECB mode liquid crystal, and a pair of transparent substrates supporting the common electrodes.

9 Claims, 5 Drawing Sheets

IMAGE RECORDING APPARATUS UTILIZING AN ECB MODE LIQUID CRYSTAL

BACKGROUND OF THE INVENTION

The present invention relates to a color-image recording apparatus employing a liquid crystal device used, for example, as a liquid crystal light shutter. More particularly, the invention relates to a color-image recording apparatus employing a liquid crystal device arranged to modulate the quantity of transmitted or reflected light by controlling the magnitude and/or application time or the frequency of a voltage applied to a liquid crystal.

Conventionally, a technique has been employed in which a light image is recorded on a photosensitive material using a liquid crystal shutter device in which liquid crystal devices are, for example, linearly arranged. FIG. 1 shows the structure and illustrates the mode of recording with such a liquid crystal shutter array. A parallel light beam is on/off controlled by a liquid crystal shutter array 10 driven with a picture signal. The light beam on/off controlled in accordance with the image or picture signal by the liquid crystal shutter array 10 is focused on a light-transmitting condenser array, for example, a Selfoc-lens array 2, so that a photosensitive material 3 is exposed to the image. ("Selfoc" is a trade name of Nippon Sheet Glass Co., Ltd., and a Selfoc lens is a refractory distribution type lens.) The liquid crystal shutter array 10 is provided with a pair of orientation films 12A and 12B disposed in opposition to each other with a gap of a predetermined distance (for example, 6$\mu$) therebetween filled with a liquid crystal 11.

Transparent pixel electrodes 13 defining the picture elements or pixels of the shutter array are embedded in the orientation film 12B, and light-intercepting photomasks are embedded in the other orientation film 12A aligned with the respective pixel electrodes 13. A transparent common electrode 14 is provided on the outside of the orientation film 12A. A layer of transparent substrate 15B of glass or the like is provided on the outside of the orientation film 12B, a layer of a transparent substrate 15A having substantially the same thickness as that of the transparent substrate 15B is provided on the outside of the common electrode 14B, and polarization plates 16A and 16B are stacked on the respective outsides of the transparent substrates 15A and 15B.

The parallel light beam 1 incident on the liquid crystal shutter array 10 reaches the pixel electrodes 13 in the above-described manner. Accordingly, by electrically controlling the pixel electrodes 13 and the common electrode 14 opposing the pixel electrodes 13, the light beam is shutter-controlled in cooperation with the photomasks 17. The light transmitted through the position of each of the pixel electrodes 13 in the liquid crystal shutter array 10 is focused by the Selfoc lens array 2 on the photosensitive material 3 so that the photosensitive material 3 is exposed to the transmitted and focused light beam to thereby optically record a picture.

In FIG. 1, generally, the parallel light beam 1 is not completely parallel, and therefore in the illustrated example the incident angle is made very large.

An apparatus for recording using separate liquid crystal shutter arrays as described above for each of three primary colors, namely, R (red), G (green) and B (blue), and in which recording is carried out line-by-line successively in the order of, for instance, R, G and B, is disclosed, for example, in Japanese Unexamined Patent Application Publication No. 186953/1982. Moreover, a color picture recording apparatus in which a cylindrical color filter of the three primary colors R, G and B is provided between the liquid crystal shutter array 10 and the photosensitive material 3 and wherein recording is effected by rotating the color filter through the respective R, G and B positions, is disclosed, for example, in Japanese Unexamined Patent Application Publication No. 275224/1984. In both of these recording apparatuses, there is a disadvantage in that the apparatus is large in size and employs complicated operations.

SUMMARY OF THE INVENTION

The present invention has been achieved under the circumstances as described above, and an object of the present invention is to provide an image recording apparatus employing a liquid crystal shutter array in which a color image or picture can be recorded with high quality using a apparatus of small size and which does not require complicated control operations of the liquid crystal shutter array.

In accordance with the above and other objects, the present invention provides an image recording apparatus for recording a color image which comprises: a liquid crystal shutter array constituted by pixel electrodes and a shutter common electrode disposed in opposition to the pixel electrodes with a gap therebetween filled with a liquid crystal, a pair of transparent substrates for supporting the pixel electrodes and the shutter common electrode therebetween, and polarization plates respectively stacked on the respective outsides of the transparent substrates, a color liquid crystal layer stacked on the liquid crystal shutter array constituted by a first and a second common electrode disposed in opposition to each other with a gap therebetween filled with an ECB mode liquid crystal and a pair of transparent substrates for supporting the first and second common electrodes by sandwiching the first and second common electrodes therebetween, and voltage application means for applying a predetermined voltage between the first and second common electrodes of the color liquid crystal layer.

DESCRIPTION OF THE PREFERRED EMBODIMENTS

Figure 2:
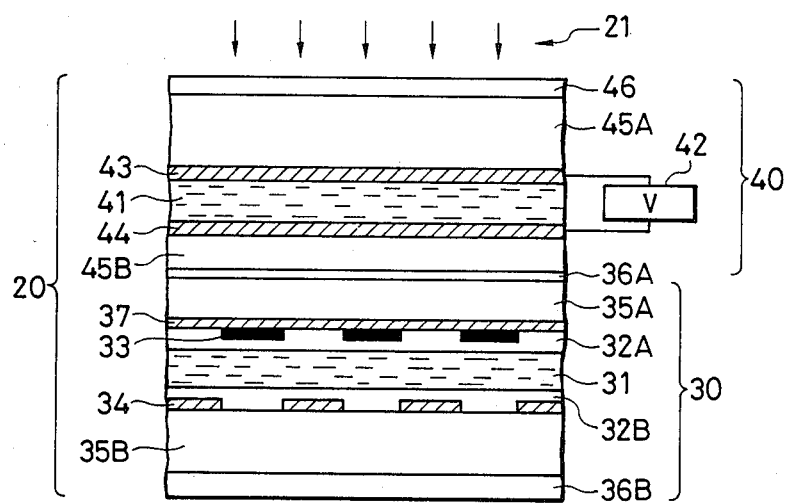
FIG. 2 is a cross-sectional view showing the structure of a preferred embodiment of a picture recording apparatus of the present invention.

FIG. 2 illustrates a preferred embodiment of an image or picture recording apparatus of the present invention. An image recording apparatus 20 according to the present invention is constituted by a general liquid crystal shutter array 30 as described above and a color liquid crystal layer 40 integrally stacked on the liquid crystal shutter array 30 on the light incident side of the latter. That is, the liquid crystal shutter array 30 is provided with orientation films 32A and 32B having a gap therebetween filled with a liquid crystal 30, and photomasks 33 and pixel electrodes are provided on the orientation films 32A and 32B, respectively, so that recording picture elements are formed by the photomasks 33 and the pixel electrodes 34.

Figure 3:
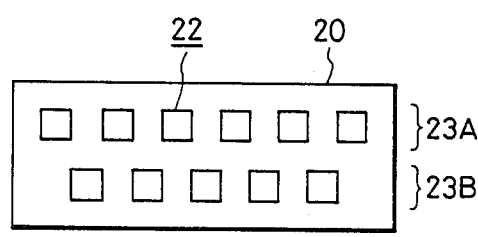
FIG. 3 is a diagram for explaining a linear liquid crystal array.

The sizes of the pixel electrodes 34 and the photomasks 33 and the positional relation therebetween are selected in such a manner, for example, as shown in FIG. 3, that recording picture elements 22 are provided in staggered form so that one recording line is formed by upper and lower picture element lines 23A and 23B. A common electrode 37 and a transparent substrate 35A are stacked on the outside of the orientation layer 32A, and a transparent substrate 35B and a polarization plate 36B are stacked on the outside of the pixel electrode 34. Further, a polarization plate 36A is stacked on the outside of the transparent substrate 35A and the color liquid crystal layer 40 is integrally stacked on the polarization plate 36A.

The color liquid crystal layer 40 is constituted by common electrodes 43 and 44 with a gap therebetween filled with an ECB (electrically controllable birefringence or voltage-controlled birefringence) mode liquid crystal 41, layers of transparent substrates 45A and 45B provided on the respective outsides of the common electrodes 43 and 44, and a polarization plate 46 stacked on the outside of the transparent substrate 45A. A power source 42 is provided for applying a voltage V between the common electrodes 43 and 44.

With respect to the ECB mode liquid crystal 41, a change in molecular orientation due to application of an electric field E (or a magnetic field) induces a change of a double refractive index Δn of the liquid crystal medium so that a change in color is perceived when looking through the liquid crystal. With respect to the initial molecular orientation (the orientation before application of the electric field E), the orientation is horizontal in the case of $N_p$ (Δε>0) and a combination of a horizontal and a vertical in the case of $N_n$ (Δε<0). The intensity I of the transmitted light is obtained as follows.

$$I = I_o \cdot \sin^2 2\theta \cdot \sin^2 \left( \frac{\pi \cdot \Delta n \cdot d}{\lambda} \right)$$

where $I_o$ represents a value determined primarily by the transmission factor of the parallel polarization plates, $\theta = 45°$ relative to the orthogonal or parallel polarization plates. Although the liquid crystal 41 is normally transparent, if there is some absorption, the intensity I becomes:

$$I = I_o \left\{ \frac{1}{4}(R_e - T_o)^2 + T_e \cdot T_o \cdot \sin^2 \left( \frac{\pi \cdot \Delta n(E) \cdot d}{\lambda} \right) \right\}$$

where $T_e$ and $T_o$ respectively represent transmittances of abnormal and normal rays in the ultraviolet range. Here, the ECB mode liquid crystal 41 has electro-optical characteristics as shown in FIGS. 4 and 5, and light in the three primary colors R, G and B can be selectively transmitted by changing the voltage V applied to the common electrodes 43 and 44.

Figure 4:
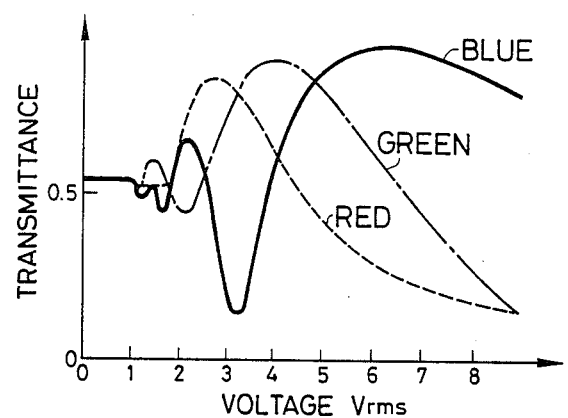
FIGS. 4 and 5 show examples of the characteristics of the ECB mode liquid crystal.
Figure 5:
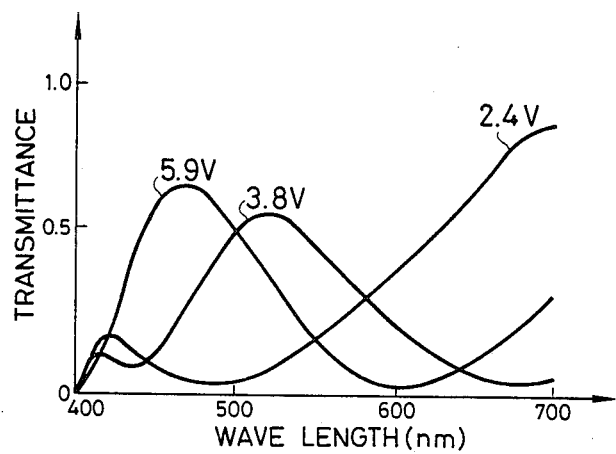

That is, the parallel light beam 21 of white light is radiated on the image or picture recording apparatus 20, the liquid crystal shutter array 30 is subjected to on/off control with respect to the respective picture elements thereof selectively in accordance with a picture signal, and the voltage V applied between the common electrodes 43 and 44 of the color liquid crystal layer 40 is changed in accordance with the characteristics shown in FIGS. 4 and 5 so that the light transmitted through the recording picture elements of the picture recording apparatus 20 can be controlled with respect to the three primary colors of R, G and B.

Figure 6:
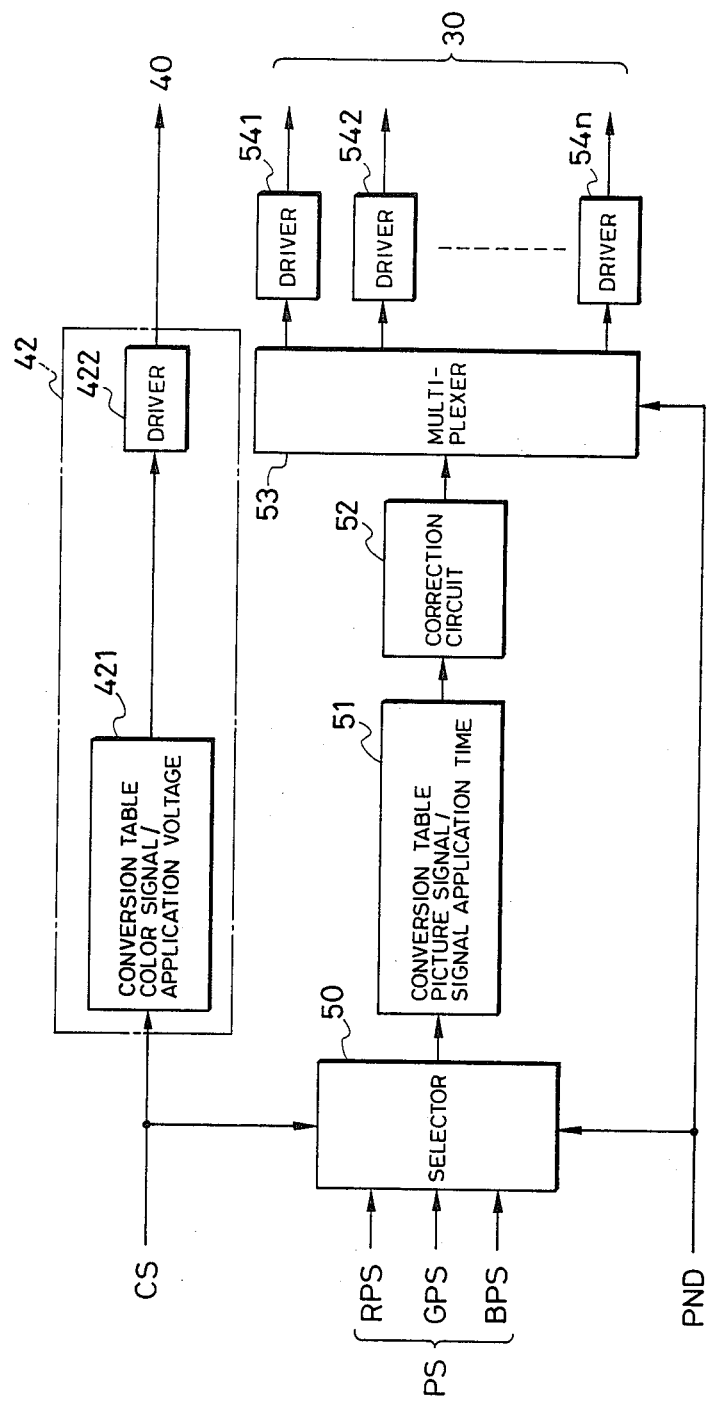
FIG. 6 is a block diagram showing the arrangement of a control system according to the present invention.
Figure 7A:
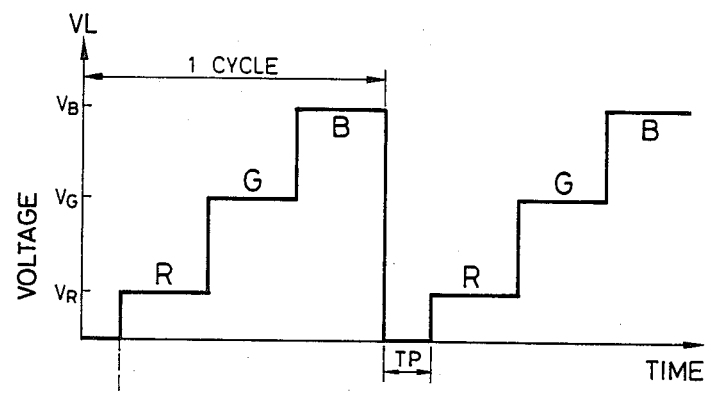
FIGS. 7(A) and 7(B) show examples of waveforms obtained during the operation of the present invention.
Figure 7B:
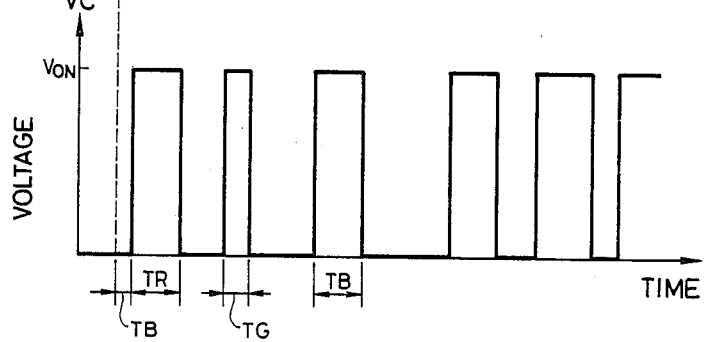

FIG. 6 shows an example of a control device used with the invention. In the control device, a picture signal PS, composed of data RPS, GPS and BPS for the respective colors R, G and B, is applied to a selector 50. The selector 50 receives as a selection control signal a signal composed of picture number data PND and a color signal CS so as to select the data RPS, GPS and BPS of the colors R, G and B successively in a predetermined order and to thereby apply the selected data to a conversion table 51. The conversion table converts the selectively applied picture signal into a signal application time corresponding to the picture signal, and the output signal application time is subjected to correction by a correction circuit 52 and then applied to a multiplexer 53. The multiplexer 53 receives the picture element number data PND as a selective signal, produces an output signal corresponding to the recording picture elements, and applies the output signal to the pixel electrodes 34 of the liquid crystal shutter array 30 through drivers 541 to 54n at a time corresponding to the picture signal PS. FIG. 7 in waveform (B) shows the state in which a voltage $D_{ON}$ for turning on the pixel electrodes 34 is applied for only the time TR in recording the color R, for only the time TG in recording the color G, and for only the time TB in recording the color B. The shutter on-time can be changed by changing the respective times TR, TG and TB to thereby change the quantity of light to be transmitted so as to provide tone gradation in the recorded image or picture. The time TB in the drawing represents the setting time of the ECB mode liquid crystal 41.

On the other hand, the color signal CS is applied to a conversion table 421 in the power source 42 so as to be converted into a predetermined application voltage in accordance with the color signal CS, and the voltage is applied across the common electrodes 42 and 44 of the color liquid crystal layer 40 through a driver 422. As shown in FIG. 7 in waveform (A), the voltage applied across the common electrodes 43 and 44 is $V_R$ in recording the color R, $V_G$ in recording the color G, and $V_B$ in recording the color B, and the time TP in which a photosensitive material is conveyed through a predetermined length (for example, a length equivalent to one recording line) is provided for every cycle. Through the operations described above, the respective recording image or picture elements are supplied with the colors of R, G and B every cycle through the color liquid crystal layer 40, and color tone is obtained by control of the opening/closing time of the shutter in the liquid crystal shutter array 30, whereby a color image is synthetically tone-recorded.

Figure 1:
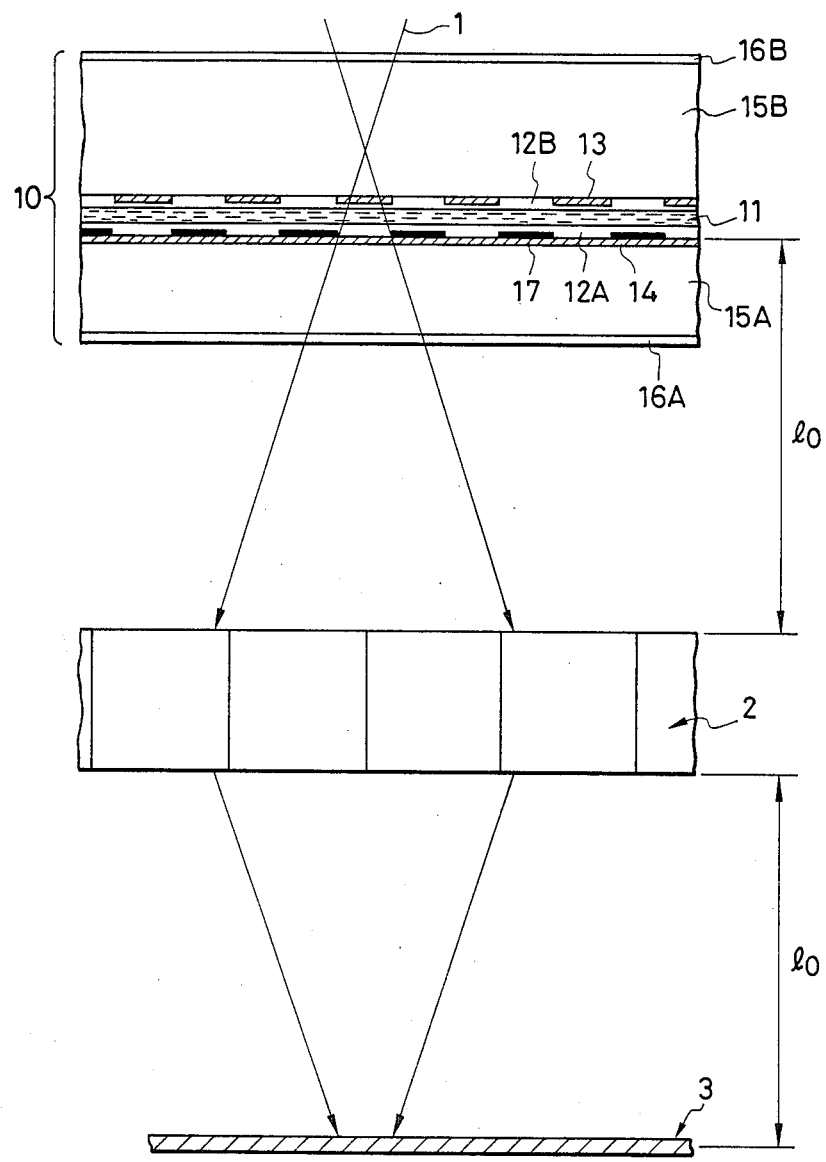
FIG. 1 shows the structure and a recording state of a conventional liquid shutter array.

Although the above embodiment has been described with respect to a case where recording of one line is carried out by staggered recording image or picture elements as shown in FIG. 3, recording may be performed in such a manner that, as shown in FIG. 1, three sets of color liquid crystal layers and liquid crystal shutter arrays are provided respectively for the three primary colors R, G and B so as to record the colors R, G and B in parallel. Further, although the color liquid crystal layer is stacked on the light incident side of the liquid crystal shutter array 30 in the embodiment of FIG. 2, the color liquid crystal layer 40 may be stacked on the light exit side of the liquid crystal shutter array 30. Furthermore, the two transparent substrates 45B and 35B and the polarization plate 36A provided between the liquid crystal shutter 30 and the color liquid crystal layer 40 are not always necessary, and lamination of the liquid crystal shutter 30 and the color liquid crystal layer 40 without using those transparent substrates 45B and 35B and the polarization plate 36A can be employed.

In the image recording apparatus according to the present invention, no color filter is necessary, the apparatus can be made small in size, and the color can be electrically continuously changed.

What is claimed is:

1. An image recording apparatus comprising:
   a liquid crystal shutter array comprising a plurality of pixel electrodes and a shutter common electrode disposed in opposition to said pixel electrodes with a gap therebetween, a liquid crystal filling said gap, a pair of transparent substrates for supporting said pixel electrodes and said shutter common electrode by sandwiching said pixel electrodes and said shutter common electrode therebetween, and polarization plates respectively stacked on the respective outsides of said transparent substrates;
   a color liquid crystal layer stacked on said liquid crystal shutter array constituted by a first and a second common electrode disposed in opposition to each other with a gap therebetween, an ECB mode liquid crystal filling said gap between said first and second common electrodes, and a pair of transparent substrates for supporting said first and second common electrodes by sandwiching said first and second common electrodes therebetween; and
   voltage application means for applying a predetermined voltage between said first and second common electrodes of said color liquid crystal layer.

2. An image recording apparatus according to claim 1, wherein said voltage application means selects said predetermined voltage from voltages respectively corresponding to red, green and blue colors.

3. An image recording apparatus according to claim 1, further comprising means for changing a time period for the opening of said shutter array in correspondence with the voltage applied to the common electrodes of the color liquid crystal layer.

4. An image recording apparatus according to claim 3, further comprising a polarization plate (46) on one of the pair of the transparent substrates of the color liquid crystal layer.

5. An image recording apparatus according to claim 3, wherein the color liquid crystal layer is stacked on a light incident side of said liquid crystal shutter array.

6. An image recording apparatus according to claim 3, wherein the color liquid crystal layer is stacked on a light exit side of said liquid crystal shutter array.

7. An image recording apparatus comprising:
   a liquid crystal shutter array comprising a plurality of pixel electrodes and a common electrode disposed in opposition to said pixel electrodes with a gp therebetween, a liquid crystal filling said gap, a first transparent substrate for supporting said pixel electrodes, and a polarization plate stacked on a side of said transparent substrate opposite said pixel electrodes;
   a color liquid crystal layer stacked on said liquid crystal shutter array and comprising a first electrode disposed in opposition to said common electrode with a gap therebetween, an ECB mode liquid crystal filling said gap between said first and common electrodes, and a second transparent substrate for supporting said first electrode; and
   voltage application means for applying a predetermined voltage between said first and common electrodes.

8. A method of color image recording, comprising the steps of:
   applying light to a color liquid crystal layer (40) containing an ECB mode liquid crystal;
   applying a first predetermined voltage between a pair of common electrodes (43, 44) of the color liquid crystal layer to permit passage through said layer of light having a first color corresponding to said first predetermined voltage, said first color being selected from the group consisting of the colors red, green and blue;
   applying light of said first color which has passed through said liquid crystal layer to a liquid crystal shutter array (30) during a first period of time while opening selected first portions of said liquid crystal shutter array 30;
   applying a second predetermined voltage between said common electrodes of the color liquid crystal layer to permit passage through said layer of light having a second color corresponding to said second predetermined voltage, said second color being selected from the group consisting of the colors red, green and blue;
   applying light of said second color which has passed through said liquid crystal layer to said liquid crystal shutter array during a second period of time while opening selected first portions of said liquid crystal shutter array 30;
   applying a third predetermined voltage between said common electrodes of the color liquid crystal layer to permit passage through said layer of light having a third color corresponding to said third predetermined voltage, said third color being selected from the group consisting of the colors red, green and blue;
   applying light of said third color which has passed through said liquid crystal layer to said liquid crystal shutter array during a third period of time while opening selected first portions of said liquid crystal shutter array 30; and
   recording a color image in accordance with light passed by said liquid crystal shutter during said first, second and third periods of time.

9. A method of color image recording, comprising the steps of:
   applying white light to a liquid crystal shutter array (30) while opening selected first portions of said liquid crystal shutter array 30;
   applying light which has passed through said liquid crystal shutter to a liquid crystal layer (40) during a first period of time while applying a first predetermined voltage between a pair of common electrodes (43, 44) of the color liquid crystal layer to permit passage through said layer of light having a first color corresponding to said first predetermined voltage, said first color being selected from the group consisting of the colors red, green and blue;

applying light which has passed through said liquid crystal shutter to said liquid crystal layer during a second period of time while applying a second predetermined voltage between said common electrodes of the color liquid crystal layer to permit passage through said layer of light having a second color corresponding to said second predetermined voltage, said second color being selected from the group consisting of the colors red, green and blue;

applying light which has passed through said liquid crystal shutter to said liquid crystal layer during a third period of time while applying a third predetermined voltage between said common electrodes of the color liquid crystal layer to permit passage through said layer of light having a third color corresponding to said third predetermined voltage, said third color being selected from the group consisting of the colors red, green and blue; and recording a color image in accordance with light passed by said liquid crystal shutter during said first, second and third periods of time.

* * * * *